(12) United States Patent
Wong et al.

(10) Patent No.: US 12,143,661 B2
(45) Date of Patent: *Nov. 12, 2024

(54) SUPPLEMENTING ENTERTAINMENT CONTENT WITH AMBIENT LIGHTING

(71) Applicant: Disney Enterprises, Inc., Burbank, CA (US)

(72) Inventors: Clifford W. Wong, Burbank, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/703,905

(22) Filed: Mar. 24, 2022

(65) Prior Publication Data

US 2022/0217435 A1      Jul. 7, 2022

Related U.S. Application Data

(63) Continuation of application No. 16/905,759, filed on Jun. 18, 2020, now Pat. No. 11,317,137.

(51) Int. Cl.
| | |
|---|---|
| *G06V 20/40* | (2022.01) |
| *G10L 25/51* | (2013.01) |
| *H04N 5/58* | (2006.01) |
| *H04N 21/426* | (2011.01) |
| *H05B 47/105* | (2020.01) |
| *H05B 47/165* | (2020.01) |

(52) U.S. Cl.
CPC .......... *H04N 21/426* (2013.01); *G06V 20/46* (2022.01); *G10L 25/51* (2013.01); *H04N 5/58* (2013.01); *H05B 47/105* (2020.01); *H05B 47/165* (2020.01); *G09G 2320/06* (2013.01)

(58) Field of Classification Search
CPC ...... H04N 21/426; H04N 5/58; H05B 47/105; G06V 20/46
See application file for complete search history.

(56) References Cited

U.S. PATENT DOCUMENTS

| | | | | |
|---|---|---|---|---|
| 6,771,323 B1 * | 8/2004 | Dean | ...................... | H04N 17/00 348/E17.001 |
| 7,616,262 B2 * | 11/2009 | Eves | .................. | H04N 21/4131 348/553 |
| 8,823,484 B2 * | 9/2014 | Kennedy | .......... | H04N 21/42202 340/3.1 |
| 8,928,811 B2 * | 1/2015 | Li | .......................... | H04N 21/81 348/602 |

(Continued)

*Primary Examiner* — Brian P Yenke
(74) *Attorney, Agent, or Firm* — Farjami & Farjami LLP

(57) ABSTRACT

According to one implementation, a system for supplementing entertainment content with ambient lighting includes a computing platform having a hardware processor and a memory storing a software code. The hardware processor is configured to execute the software code to receive an entertainment content, detect one or more attributes of the entertainment content that correspond to an artistic intent of a producer of the entertainment content, and interpret the artistic intent of the producer of the entertainment content using the detected one or more attributes. The hardware processor is further configured to execute the software code to compose an ambient lighting routine as a supplement to the entertainment content based on the interpreted artistic intent.

20 Claims, 4 Drawing Sheets

(56) References Cited

U.S. PATENT DOCUMENTS

| | | | | |
|---|---|---|---|---|
| 9,226,048 B2* | 12/2015 | Messmer | H04N 21/235 | |
| 9,230,338 B2* | 1/2016 | Kunkel | G06T 5/00 | |
| 9,473,813 B2* | 10/2016 | Gupta | H04N 21/436 | |
| 9,554,020 B2* | 1/2017 | Thurston, III | H04N 9/69 | |
| 9,584,786 B2* | 2/2017 | Atkins | H04N 5/44504 | |
| 9,842,532 B2* | 12/2017 | Motta | G09G 3/2092 | |
| 10,057,644 B1* | 8/2018 | Farre Guiu | H04N 21/44008 | |
| 10,073,861 B2* | 9/2018 | Shamir | G06F 40/186 | |
| 10,140,953 B2* | 11/2018 | Wanat | G09G 5/10 | |
| 10,268,969 B2* | 4/2019 | Snoddy | G06N 20/00 | |
| 10,402,240 B2* | 9/2019 | Scanlon | G06F 9/546 | |
| 10,452,874 B2* | 10/2019 | Smith | H04N 21/858 | |
| 10,467,808 B2* | 11/2019 | Murdock | A63F 13/47 | |
| 10,512,845 B2* | 12/2019 | Chai | A63F 13/58 | |
| 10,583,361 B2* | 3/2020 | Goslin | A63F 13/32 | |
| 10,732,432 B2* | 8/2020 | Haseltine | G09G 3/003 | |
| 10,761,343 B2* | 9/2020 | Haseltine | G09G 3/003 | |
| 10,856,041 B2* | 12/2020 | Farre Guiu | H04N 21/4668 | |
| 11,477,525 B2* | 10/2022 | Daly | H04N 21/440245 | |
| 2003/0007567 A1* | 1/2003 | Newman | H04N 19/63 | 375/240.27 |
| 2007/0081102 A1* | 4/2007 | Ramanath | H04N 9/73 | 348/602 |
| 2008/0094515 A1* | 4/2008 | Gutta | H04N 9/73 | 348/602 |
| 2008/0284854 A1* | 11/2008 | Thurston, III | G06T 5/50 | 348/246 |
| 2009/0219305 A1* | 9/2009 | Diederiks | H05B 47/155 | 345/690 |
| 2009/0237567 A1* | 9/2009 | Tsao | H05B 45/20 | 348/602 |
| 2010/0005062 A1* | 1/2010 | Van Den Dungen | H04N 21/436 | 707/E17.014 |
| 2010/0066911 A1* | 3/2010 | Grotenhuis | H05B 47/155 | 348/602 |
| 2010/0177247 A1* | 7/2010 | Sekulovski | H05B 47/10 | 348/602 |
| 2010/0231140 A1* | 9/2010 | Aarts | H05B 47/155 | 315/307 |
| 2010/0265414 A1* | 10/2010 | Nieuwlands | H04N 9/73 | 348/739 |
| 2011/0123168 A1* | 5/2011 | Cho | H04N 21/812 | 386/230 |
| 2011/0141366 A1* | 6/2011 | Yoon | G09G 5/005 | 348/602 |
| 2011/0175925 A1* | 7/2011 | Kane | G01J 1/4204 | 345/589 |
| 2012/0019726 A1* | 1/2012 | Arora | H04N 21/42202 | 348/602 |
| 2012/0081279 A1* | 4/2012 | Greenebaum | G09G 5/02 | 345/207 |
| 2012/0242250 A1* | 9/2012 | Coezijn | H04N 21/4318 | 315/297 |
| 2013/0021527 A1* | 1/2013 | Chen | H04N 5/64 | 348/602 |
| 2013/0038790 A1* | 2/2013 | Seetzen | H04N 9/67 | 348/E9.037 |
| 2013/0076974 A1* | 3/2013 | Atkins | H04N 21/42202 | 375/240.03 |
| 2013/0088644 A1* | 4/2013 | Atkins | H04N 21/25825 | 348/602 |
| 2014/0104498 A1* | 4/2014 | Li | H05B 47/155 | 348/602 |
| 2014/0160143 A1* | 6/2014 | Ballestad | G09G 5/02 | 345/589 |
| 2015/0063632 A1* | 3/2015 | Deng | G06T 5/007 | 382/103 |
| 2015/0089551 A1* | 3/2015 | Bruhn | H04N 5/58 | 725/80 |
| 2015/0279115 A1* | 10/2015 | Vukicevic | H04N 1/00835 | 345/633 |
| 2015/0350804 A1* | 12/2015 | Crockett | H04S 5/005 | 381/307 |
| 2016/0092561 A1* | 3/2016 | Liu | G06F 16/7837 | 386/230 |
| 2016/0119525 A1* | 4/2016 | Wolf | G03B 7/17 | 348/234 |
| 2016/0163321 A1* | 6/2016 | Arnott | G10L 19/167 | 704/500 |
| 2016/0189409 A1* | 6/2016 | Aiba | G06T 15/503 | 345/629 |
| 2016/0205372 A1* | 7/2016 | Liu | H04N 9/67 | 348/453 |
| 2016/0343130 A1* | 11/2016 | Wang | G06V 10/763 | |
| 2017/0034520 A1* | 2/2017 | Rosewarne | H04N 19/68 | |
| 2017/0062005 A1* | 3/2017 | Kolesnikov | H04N 5/76 | |
| 2017/0092229 A1* | 3/2017 | Greenebaum | G09G 5/10 | |
| 2017/0339506 A1* | 11/2017 | Chen | H04S 3/008 | |
| 2018/0041696 A1* | 2/2018 | Balasubramanian | H04N 5/23216 | |
| 2018/0089513 A1* | 3/2018 | Cremonesi | G06V 20/41 | |
| 2018/0102106 A1* | 4/2018 | Shintani | H04N 21/8456 | |
| 2018/0204333 A1* | 7/2018 | Miyazawa | G06V 10/62 | |
| 2018/0211440 A1* | 7/2018 | Kunkel | G09G 3/00 | |
| 2019/0069375 A1* | 2/2019 | Baker | H04N 21/43635 | |
| 2019/0236990 A1* | 8/2019 | Song | G06T 3/0062 | |
| 2019/0253747 A1* | 8/2019 | Ramaswamy | H04N 21/431 | |
| 2019/0313050 A1* | 10/2019 | Wang | H04N 5/58 | |
| 2020/0033602 A1* | 1/2020 | Nocon | G06F 3/147 | |
| 2020/0187337 A1* | 6/2020 | Julian | B60Q 1/44 | |
| 2020/0202814 A1* | 6/2020 | Chapiro | G09G 5/10 | |
| 2020/0234052 A1* | 7/2020 | Bergman | G06V 10/56 | |
| 2020/0246714 A1* | 8/2020 | Rosenthal | A63H 30/04 | |
| 2021/0042892 A1* | 2/2021 | Colaitis | G06T 5/20 | |
| 2021/0049747 A1* | 2/2021 | McCarthy | G06T 5/009 | |
| 2021/0409729 A1* | 12/2021 | Gao | H04N 19/17 | |

* cited by examiner

SUPPLEMENTING ENTERTAINMENT CONTENT WITH AMBIENT LIGHTING

This application is a Continuation of U.S. application Ser. No. 16/905,759, filed Jun. 18, 2020.

BACKGROUND

As anyone who has enjoyed a suspenseful movie or television (TV) episode can attest, the sound effects accompanying the video images and dialogue can act as powerfully to convey the artistic intent of the producers of that movie or TV content as the images and dialogue themselves, by influencing a viewer's psychological response to that content. Modulation of ambient lighting, too, can create a more immersive and compelling entertainment experience for the viewer. However, although decisions surrounding camera use, dialogue, and sound effects are made during production of the entertainment content and are typically "baked in" features of the content accessed by a consumer, lighting effects typically are not. That, is to say, outside of a cinema, where some limited ambient lighting effects may accompany a big screen presentation of a movie, ambient lighting effects in a private content consumption environment such as a personal residence are generated as aftermarket effects independent of the artistic intent motivating the content they accompany.

Conventional approaches to modulating ambient light to accompany entertainment content rely on average color values and/or pixel intensities across entire video frames. Although such solutions are grossly responsive to transitions within content due to their responsiveness to average color and/or overall brightness, no attempt is being made to interpret the artistic intent motivating the use of color, brightness, or camera position in production of the content. Consequently, there is a need in the art for solutions enabling supplementation of entertainment content with ambient light modulation that is responsive to the artistic intent of the content producer or producers.

SUMMARY

There are provided systems and methods for supplementing entertainment content with ambient lighting, substantially as shown in and/or described in connection with at least one of the figures, and as set forth more completely in the claims.

DETAILED DESCRIPTION

Figure 1:
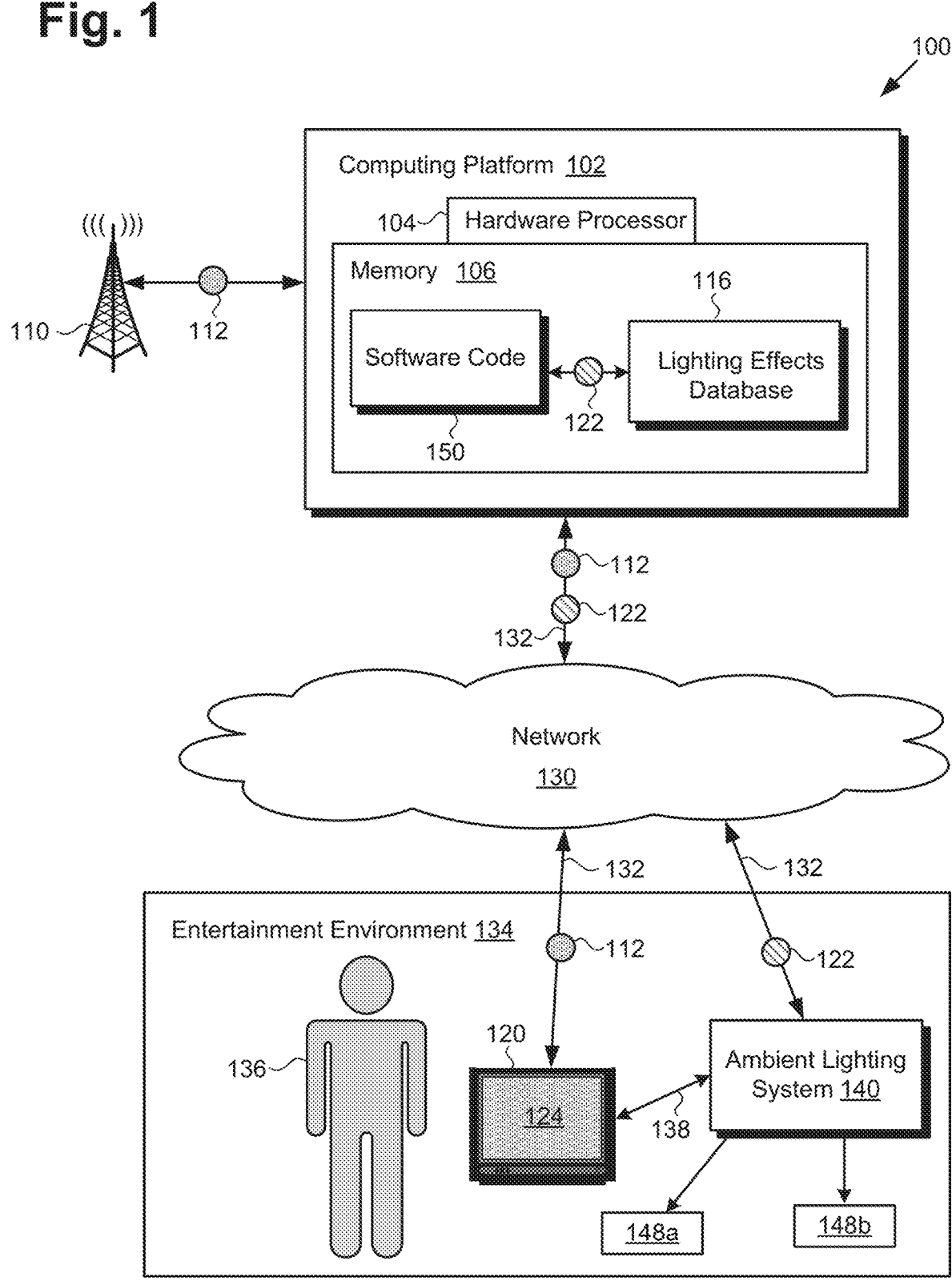
FIG. 1 shows an exemplary system for supplementing entertainment content with ambient lighting, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for supplementing entertainment content with ambient lighting that address and overcome the deficiencies in the conventional art. In some implementations, the systems and methods disclosed by the present application may be substantially or fully automated. It is noted that, as used in the present application, the terms "automation," "automated," and "automating" refer to systems and processes that do not require the participation of a human system operator. Although in some implementations a human user may make adjustments to the automated systems described herein that human involvement is optional. Thus, the methods described in the present application may be performed under the control of hardware processing components of the disclosed automated systems.

FIG. 1 shows exemplary system 100 for supplementing entertainment content with ambient lighting, according to one implementation. As shown in FIG. 1, system 100 may include computing platform 102 having hardware processor 104 and memory 106 implemented as a non-transitory storage device. According to the present exemplary implementation, memory 106 stores software code 150 and lighting effects database 116. It is noted that lighting effects database 116 stores one or more predetermined ambient lighting routines composed by software code 150 and represented in FIG. 1 by ambient lighting routine 122.

As further shown in FIG. 1, system 100 is implemented within a use environment including content source 110 providing entertainment content 112 to system 100. The use environment also includes communication network 130 and entertainment environment 134, such as a private residence for example, including ambient lighting systems 140, one or more lighting elements 148a and/or 148b communicatively coupled to ambient lighting system 140, and output device 120 having display 124. Also shown in FIG. 1 is user 136 of output device 120 and ambient lighting system 140, network communication links 132 of communication network 130 interactively connecting system 100 with ambient lighting system 140 and output device 120, and ambient lighting routine 122 received by ambient lighting system 140 from system 100.

As discussed in greater detail below, according to the exemplary implementation shown in FIG. 1, software code 150, when executed by hardware processor 104 of system 100, is configured to detect and analyze one or more attributes of entertainment content 112 to interpret the artistic intent of the producer of entertainment, content 112. Hardware processor 104 may then further execute software code 150 to compose ambient lighting routine 122 as a supplement to entertainment content 112 based on that interpreted artistic intent. Subsequent to its composition by software code 150, ambient lighting routine 122 may be stored in lighting effects database 116 and/or may be transmitted to ambient lighting system 140 via communication network 130.

In use cases in which ambient lighting routine 122 is transmitted to ambient lighting system 140 by system 100, ambient lighting system 140 may control one or more lighting elements 148a and/or 148b to perform ambient lighting routine 122 while entertainment content 112 is played by output device 120. By controlling one or more lighting elements 148a and/or 148b to perform ambient lighting routine 122 while entertainment content 112 is played, ambient lighting system 140 can advantageously provide user 136 with a more immersive and enhanced entertainment consumption experience.

Although the present application refers to software code 150 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102 or to a hardware processor of ambient lighting system 140. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs such as DVDs, RAM, programmable read-only memory (PROM), erasable PROM (EPROM), and FLASH memory.

Moreover, although FIG. 1 depicts software code 150 as being stored as a single set of software instructions, that representation is also merely exemplary. More generally, system 100 may include one or more computing platforms, such as computer servers for example, which may form an interactively linked but distributed system, such as a cloud-based system, for instance. As a result, hardware processor 104 and memory 106 may correspond to distributed processor and memory resources within system 100. Thus, lighting effects database 116, as well as the various software modules included in software code 150 and described below by reference to FIG. 4 may be stored remotely from one another and may be executed by the distributed processor resources of system 100.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network.

It is further noted that, although output device 120 is shown as a smart television (smart TV) in FIG. 1 that representation is provided merely by way of example. In other implementations, output device 120 may take the form of any suitable mobile or stationary computing device or system that implements data processing capabilities sufficient to provide a user interface, support connections to communication network 130, and implement the functionality ascribed to output device 120 herein. That is to say, in other implementations, output device 120 may take the form of a desktop computer, laptop computer, tablet computer, smartphone, digital media player, game console, or a wearable communication device such as a smartwatch, to name a few examples.

However, in other implementations, output device 120 may not be a smart device. Rather in some implementations, output device 120 may take the form of one or more speakers, or a display screen, such as display 124, any of which may be separate from but communicatively coupled to ambient lighting system 140, or may be integrated with ambient lighting system 140 so as to be one or more components of ambient lighting system 140. In implementations in which output device 120 is or includes display 124, display 124 may take the form of a liquid crystal display (LCD), light-emitting diode (LED) display, organic light-emitting diode (OLED) display, quantum LED (QLED) display, or any other suitable display screen that perform a physical transformation of signals to light.

Regarding one or more lighting elements 148a and/or 148b, it is noted that although FIG. 1 depicts two lighting elements, in other implementation, entertainment environment 134 may include as few as one lighting element, or more than two lighting elements. Moreover, the various lighting elements included among one or more lighting elements 148a and/or 148b may be situated in various locations in entertainment environment 134 relative to user 136 and output device 120. For instance, one or more of lighting elements 148a and/or 148b may be situated behind output device 120, i.e., output device 120 is situated between that/those lighting elements and user 136. Alternatively, or in addition, one or more of lighting elements 148a and/or 148b may be situated behind user 136, i.e., user 136 is situated between that/those lighting elements and output device 120. Alternatively, or in addition, one or more of lighting elements 148a and/or 148b may be situated in locations within entertainment environment 134 that are neither behind user 136 nor behind output device 120.

Each of one or more lighting elements 148a and/or 148b may take a variety of forms. For example, each of one or more lighting elements 148a and/or 148b may be implemented as light bulbs, light rings, light bars, projectors or light walls, for example, which may provide incandescent, fluorescent, or LED lighting. Moreover, in some implementations, one or more lighting elements 148a and/or 148b may be smart lighting elements configured to be wirelessly controlled by ambient lighting system 140. In those implementations, ambient lighting system 140 and one or more lighting elements 148a and/or 148b may be configured to communicate via one or more of WiFi, Bluetooth, ZigBee, and 60 GHz wireless communications methods.

Content source 110 may be a media entity providing entertainment content 112 in the form or audio content and/or video content. For example, entertainment content 112 may be music content. Alternatively, entertainment content 112 may include frames of video from a video game, movie, or a linear TV program stream, for example. Such movie or TV video content may include a high-definition (HD) or ultra-HD (UHD) baseband video signal with embedded audio, captions, time code, and other ancillary metadata, such as ratings and/or parental guidelines. In some implementations, entertainment content 112 provided by content source 110 may include multiple audio tracks, and may utilize secondary audio programming (SAP) and/or Descriptive Video Service (DVS), for example.

Entertainment content 112 provided by content source 110 may be the same source video that is broadcast to a traditional TV audience. Thus, content source 110 may take the form of a conventional cable and/or satellite TV network, for example. As depicted in FIG. 1, content source 110 may find it advantageous or desirable to make entertainment content 112 available via an alternative distribution channel, such as communication network 130, which may take the form of a packet-switched network, for example, such as the Internet, as noted above. For instance, system 100 may be utilized by content source 110 to distribute entertainment content 112, in some use cases accompanied by ambient lighting routine 122, as part of a program stream, which may be an Internet Protocol (IP) programming stream provided by a streaming service, or a video-on-demand (VOD) service.

Figure 2:
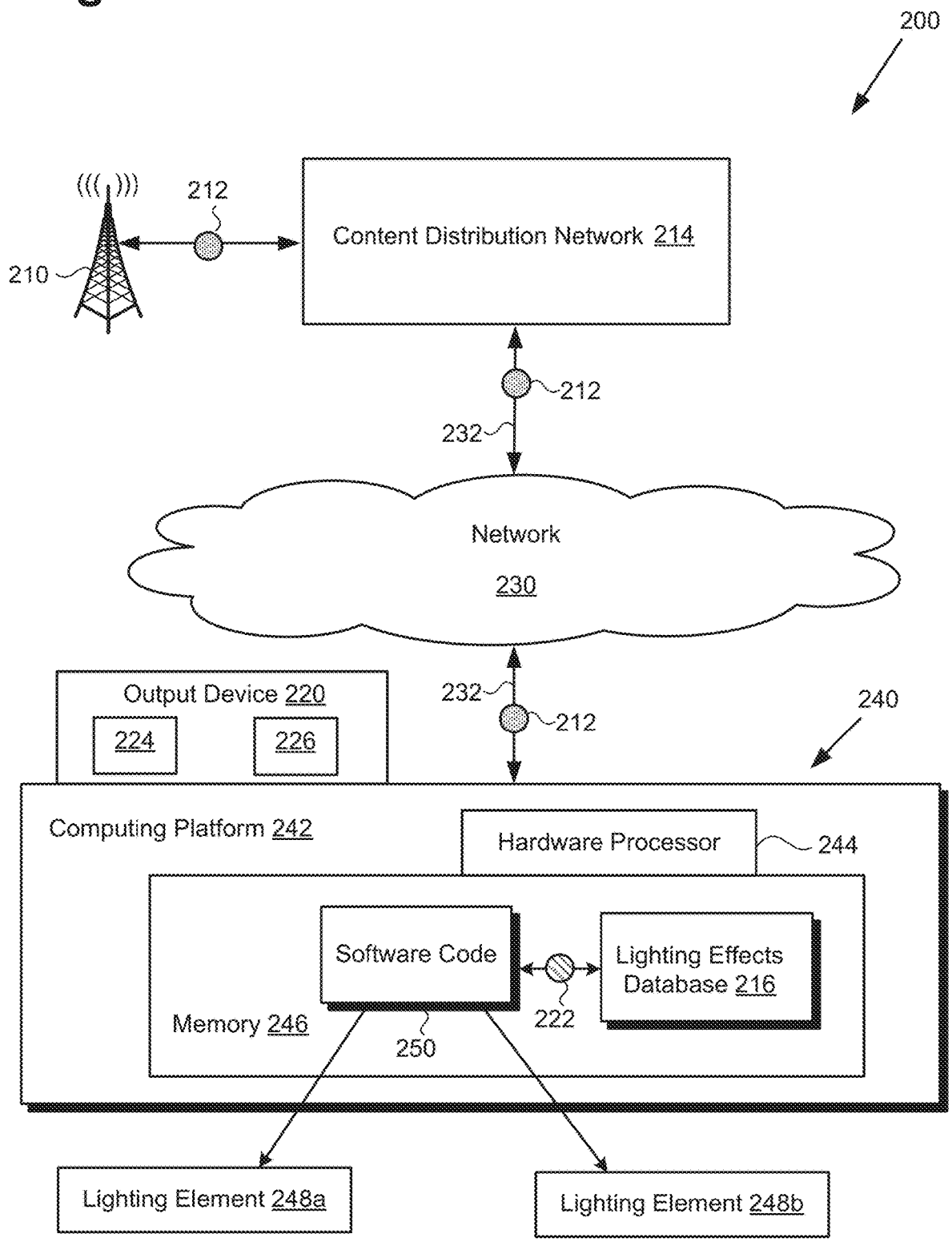
FIG. 2 shows another exemplary implementation of a system for supplementing entertainment content with ambient lighting.

FIG. 2 shows another exemplary system, i.e., ambient lighting system 240, for supplementing entertainment content with ambient lighting. As shown in FIG. 2, ambient lighting system 240 includes computing platform 242 having hardware processor 244, and memory 246 implemented as a non-transitory storage device storing software code 250 and lighting effects database 216, as well as output device 220 including display 224 and/or speaker 226. It is noted that, in various implementations, output device 220 including display 224 and/or speaker 226 may be physically integrated with ambient lighting system 240 or may be communicatively coupled to but physically separate from ambient lighting system 240. For example, where ambient lighting system 240 is implemented as a smartphone, laptop computer, or tablet computer, display 224 and speaker 226 will typically be integrated with ambient lighting system 240. By contrast, where ambient lighting system 240 is implemented as a desktop computer, display 224 may take the form of a monitor separate from computing platform 242 in the form of a computer tower, while speaker 226 may be a stand-alone speaker having a wired or wireless connection to the computer tower.

As further shown in FIG. 2, ambient lighting system 240 is utilized in use environment 200 including content source 210 providing entertainment content 212 to content distribution network 214, which in turn distributes entertainment content 212 to ambient lighting system 240 via communication network 230 and network communication links 232. According to the implementation shown in FIG. 2, software code 250 stored in memory 246 of ambient lighting system 240 is configured to receive entertainment content 212 as an input and to output ambient lighting routine 222 as a supplement to entertainment content 212 when played by display 224 and/or speaker 226 of output device 220. Also shown in FIG. 2 are one or more lighting elements 248*a* and/or 248*b* communicatively coupled to ambient lighting system 240.

Content source 210, entertainment content 212, ambient lighting routine 222, communication network 230, and network communication links 232 correspond respectively in general to content source 110, entertainment content 112, ambient lighting routine 122, communication network 130, and network communication links 132, in FIG. 1. In other words, content source 210, entertainment content 212, ambient lighting routine 222, communication network 230, and network communication links 232 may share any of the characteristics attributed to respective content source 110, entertainment content 112, ambient lighting routine 122, communication network 130, and network communication links 132 by the present disclosure, and vice versa.

Ambient lighting system 240, output device 220 including display 224 and/or speaker 226, and one or more lighting elements 248*a* and/or 248*b* correspond respectively in general to ambient lighting system 140, output device 120 including display 124, and one or more lighting elements 148*a* and/or 148*b*, in FIG. 1. Thus, ambient lighting system 140, output device 120, display 124, and one or more lighting elements 148*a* and/or 148*b* may share any of the characteristics attributed to respective ambient lighting system 240, output device 220, display 224, and one or more lighting elements 248*a* and/or 248*b* by the present disclosure, and vice versa. That is to say, like output device 220, in some implementations, output device 120 may be an integrated component of ambient lighting system 140 and may include speaker 226. Moreover, like display 124, display 224 may take the form of an LCD, LED display, OLED display, or QLED display, for example.

In addition, like one or more lighting elements 148*a* and/or 148*b*, one or more lighting elements 248*a* and/or 248*b* may be implemented as incandescent, fluorescent, or LED lighting elements, and in some implementations may be configured for wireless communication with ambient lighting system 240 via one or more of WiFi, Bluetooth, ZigBee, and 60 GHz wireless communications methods. Furthermore, although not shown in FIG. 1, ambient lighting system 140 may include features corresponding respectively to computing platform 242, hardware processor 244, and memory 246 storing software code 250 and lighting effects database 216.

Hardware processor 244 may be the central processing unit (CPU) for ambient lighting system 240, for example, in which role hardware processor 244 executes software code 250. Software code 250 corresponds in general to software code 150, in FIG. 1, and is capable of performing all of the operations attributed to software code 150 by the present disclosure. In other words, in implementations in which hardware processor 244 executes software code 250 on computing platform 242 of ambient lighting system 210, ambient lighting system 240 may perform any of the actions attributed to system 100 by the present disclosure.

Thus, software code 250, when executed by hardware processor 244, may be configured to detect and analyze one or more attributes of entertainment content 212 to interpret the artistic intent of the producer of entertainment content 212. Hardware processor 244 may then further execute software code 250 to compose ambient lighting routine 222 as a supplement to entertainment content 212 based on that interpreted artistic intent. Subsequent to its composition by software code 250, ambient lighting routine 222 may be stored in lighting effects database 216 and/or may be used by ambient lighting system 240 to control one or more lighting elements 248*a* and/or 248*b* to perform ambient lighting routine 222 while entertainment content 212 is played by output device 220. By controlling one or more lighting elements 248*a* and/or 248*b* to perform ambient lighting routine 222 while entertainment content 212 is played, ambient lighting system 240 can advantageously provide a user of ambient lighting system 240, such as user 136 in FIG. 1, with a more immersive, enhanced, entertainment consumption experience.

Figure 3:
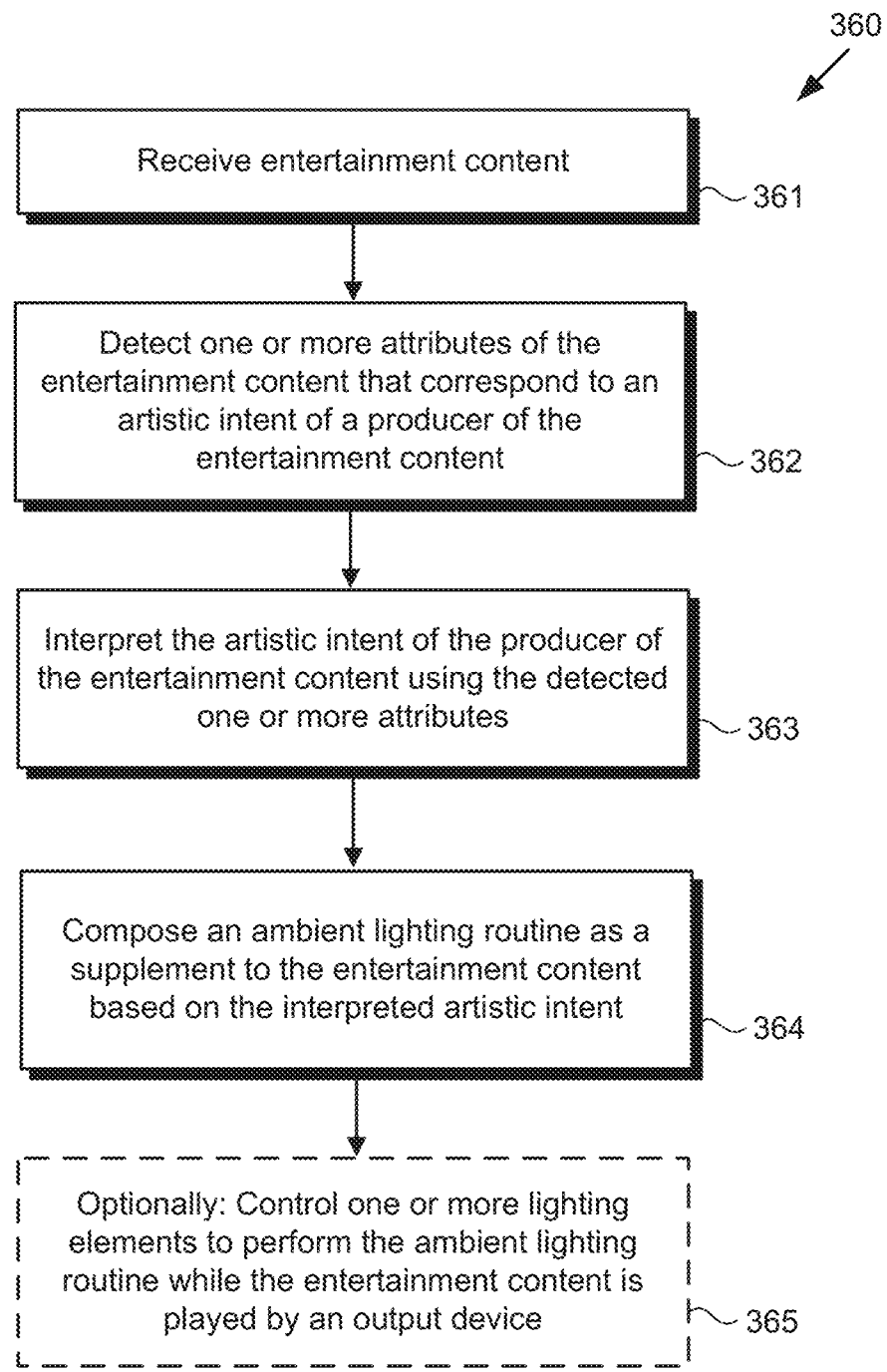
FIG. 3 shows a flowchart presenting an exemplary method for supplementing entertainment content with ambient lighting, according to one implementation.

The functionality of system 100, ambient lighting system 240, and software code 150/250 will be further described by reference to FIG. 3 in combination with FIGS. 1, 2, and 4. FIG. 3 shows flowchart 360 presenting an exemplary method for use by a system, such as system 100 in FIG. 1, or ambient lighting system 240 in FIG. 2, for supplementing entertainment content with ambient lighting. With respect to the method outlined in FIG. 3, it is noted that certain details and features have been left out of flowchart 360 in order not to obscure the discussion of the inventive features in the present application.

Figure 4:
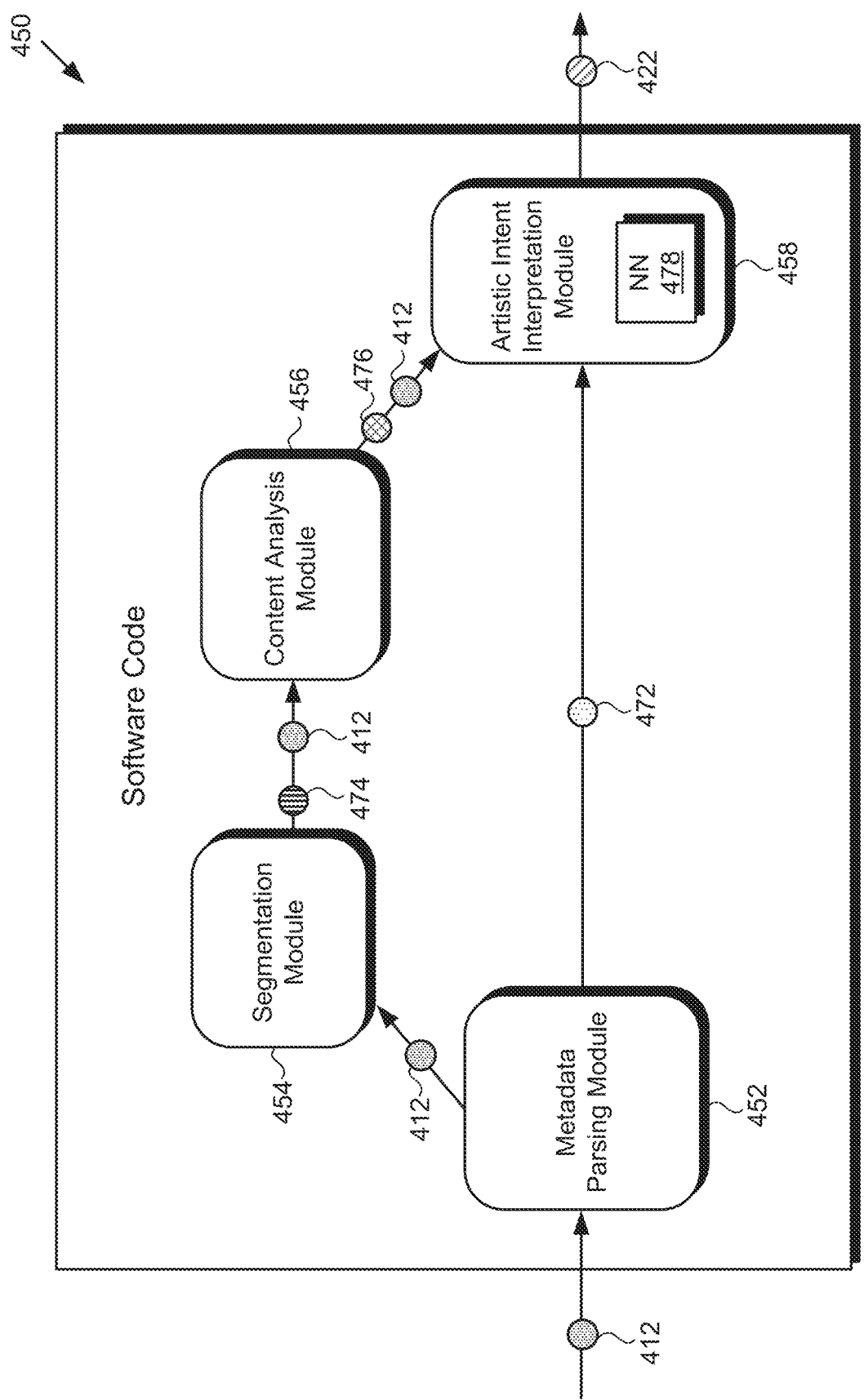
FIG. 4 shows an exemplary software code suitable for use by the systems shown in FIGS. 1 and 2, according to one implementation.

FIG. 4 shows exemplary software code 450 suitable for execution by hardware processor 104 of system 100, or by hardware processor 244 of ambient lighting system 240, according to one implementation. As shown in FIG. 4, software code 450 may include metadata parsing module 452, segmentation module 454, content analysis module 456, and artistic intent interpretation module 458, which, in some implementations, may include an artificial neural network, depicted in FIG. 4 as NN 478. Also shown in FIG. 4 is entertainment content 412, ambient lighting routine 422 composed by software code 450 to supplement entertainment content 412, metadata 472, segmentation data 474, and attribute data 476.

With respect to NN 478, it is noted that as defined in the present application, an artificial neural network, also known simply as a neural network (hereinafter "NN"), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, the feature labeled as NN 478 refers to a deep neural network. Various forms of NNs may be used to make predictions about new data based on past examples or "training data."

Entertainment content 412 and ambient lighting routine 422 correspond respectively in general to entertainment content 112/212 and ambient lighting routine 122/222, in FIGS. 1 and 2, and may share any of the characteristics attributed to those corresponding features by the present disclosure. Moreover, software code 450 corresponds in general to software code 150/250, in FIGS. 1 and 2, and those corresponding features may share the characteristics attributed to any one of software code 150, 250, or 450 by the present disclosure. That is to say, like software code 450, software code 150/250 may include modules corresponding respectively to metadata parsing module 452, segmentation module 454, content analysis module 456, and artistic intent interpretation module 458 optionally including NN 478.

Referring now to FIG. 3 in combination with FIGS. 1, 2, and 4, flowchart 360 begins with receiving entertainment content 112/212/412 (action 361). As noted above, entertainment content 112/212/412 may be video content or audio-video (AV) content from a linear TV program stream, for example, including an HD or UHD baseband video signal. Alternatively, in some implementations, entertainment content 112/212/412 may be video content or AV content from a video game, or may be non-video audio content, such as music content, for example.

Referring specifically to FIG. 1, in some implementations, entertainment content 112/412 may be provided to system 100 by content source 110, which may be a conventional cable and/or satellite TV network, for example. In those implementations, entertainment content 112/412 may be received by software code 150/450, executed by hardware processor 104 of system 100.

Alternatively, or in addition, referring to FIG. 2, in some implementations, entertainment content 212/412 may be provided to content distribution network 214 by content source 210 for distribution as streaming content, for example. In those implementations, entertainment content 212/412 may be received by software code 250/450, executed by hardware processor 244 of ambient lighting system 240, via communication network 230 and network communication links 232.

Flowchart 360 continues with detecting one or more attributes of entertainment content 112/212/412, the one or more attributes corresponding to an artistic intent of a producer of entertainment content 112/212/412 (action 362). The one or more attributes corresponding to the artistic intent of the producer of entertainment content 112/212/412 (hereinafter "attribute(s)") may take a variety of forms and may be detected in a variety of ways. For example, in some implementations, such attribute(s) of entertainment content 112/212/412 may include metadata 472 (hereinafter "metadata attribute(s) 472") expressly or impliedly describing the artistic intent motivating a particular audio track or a particular frame, shot, or scene of video.

It is noted that, as used in the present application, the term "shot," as applied to video content, refers to a sequence of frames of video that are captured from a unique camera perspective without cuts and/or other cinematic transitions, while a scene refers to two or more consecutive shots. Thus, when entertainment content 112/212/412 includes video content, metadata attribute(s) 472 may describe the artistic intent motivating a single frame of video, a shot including multiple frames, and/or a scene including multiple shots. In implementations in which entertainment content 112/212/412 includes metadata attribute(s) 472, that/those attribute(s) may be detected by metadata parsing module 452 of software code 150/250/450.

Alternatively, or in addition, in some implementations, the attribute(s) of entertainment content 112/212/412 may be detected through the analysis of the features or properties of the content included in entertainment content 112/212/412. For example, where entertainment content 112/212/412 includes audio content, the attribute(s) of entertainment content 112/212/412 may include one or more of a volume (i.e., loudness) or a size of a segment of the audio, such as a predetermined volume or the size of a particular audio track. Detection of such attributes of entertainment content 112/212/412 may be performed by segmentation module 454 of software code 150/250/450. That is to say, segmentation module 454 may output segmentation data 474 identifying the beginnings and ends of distinct audio tracks included in entertainment content 112/212/412. Content analysis module 456 of software code 150/250/450 may then be used to analyze the one or more audio tracks identified in segmentation data 474.

Moreover, because a producer of AV content may rely on included audio, in the form of music for example, to deliver emotion, to signal scene changes including fade-ins and fade-outs, and/or to signal the approach of a dramatic climax or denouement, the audio portion of AV content may prove highly probative of artistic intent. Consequently, where entertainment content 112/212/412 includes AV content, action 362 may include analysis of the included audio.

Where entertainment content 112/212/412 includes video content, the attribute(s) of entertainment content 112/212/412 may be detected by segmentation module 454 of software code 150/250/450 to identify the beginnings and ends of distinct shots and/or scenes of video, followed by analysis of those shots and/or scenes by content analysis module 456. Thus segmentation module 454 may output segmentation data 474 identifying the beginnings and ends of distinct shots and/or scenes. Content analysis module 456 may then be used to analyze the shots and/or scenes identified in segmentation data 474, and/or to analyze individual video frames included in those shots and/or scenes.

In some implementations, identification of shots and/or scenes of video may be performed by segmentation module 454 using computer vision techniques, such as feature detection, for example. For instance, features to be detected in a frame of video may include one or more of a relative size, position, and/or angle of one or more individual faces depicted in frame, one or more actions that may be taking place, and one or more background features appearing in the frame. Segmentation module 454 may detect features in video frames using one or more of "speeded up robust features" (SURF), "scale-invariant feature transform" (SIFT), and/or other techniques.

Segmentation module 454 may also be configured to identify shots or scenes by tracking features, such as faces, objects, and/or backgrounds, over consecutive frames. Feature detection and/or tracking may be accomplished using object recognition, pattern recognition, and/or other image processing techniques. By way of example, face detection and/or tracking may be accomplished using a "sophisticated high-speed object recognition engine" (SHORE), Viola-Jones object detection framework, and/or other techniques.

Content analysis module 456 may analyze segmentation data 474 received from segmentation module 454 using one or more of several techniques. In some implementations, content analysis module 456 may divide an individual video frame into regions and preferentially weight the importance of some regions of the frame over others. For example, the attribute(s) of video content being detected in action 362 may be more likely to be present in the center of a video frame. Consequently, content analysis module 456 may divide a frame into sections, such as thirds, for example, and concentrate analysis of the frame on the central third. Alternatively, or in addition, regions of a video frame that include more than a predetermined number of pixels exceeding a threshold brightness or color intensity may be preferentially weighed regardless of its location in the frame.

As another alternative, or in addition, analysis of a video frame may be based on the focus area of the frame. In movie production, for example, there is often a camera operator tasked with adjusting the focus so as to remain on the main subject of the frame. Consequently, camera focus may be an important attribute for use in interpreting artistic intent. As another alternative, or in addition, content analysis module 456 may be configured to perform high-pass and/or low-pass filtering techniques on video frames or the shots and/or scenes included in entertainment content 112/212/412 and identified in segmentation data 474. That is to say, the video signal remaining after the high-pass filtering and/or low pass filtering have been performed may be more probative of the artistic intent of the producer of entertainment content 112/212/412 than the high and/or low frequency video signal that is filtered out.

As yet other alternatives, or in addition, analysis of video content may include detecting attribute(s) such as the camera position used to capture a frame, shot, or scene, the composition of the frame, shot, or scene, or the size of a shot or scene. Thus, where entertainment content 112/212/412 includes video content, the attribute(s) of entertainment content 112/212/412 detected in action 362 may include one or more of the camera position used to capture a segment of the video, the region of focus, the region of brightness, the composition, or the size of the segment of the video.

Referring to FIG. 1, in some implementations, detection of the attribute(s) of entertainment content 112/212/412 corresponding to the artistic intent of the producer of entertainment content 112/212/412 may be performed by software code 150/450, executed by hardware processor 104 of system 100, and using one or more of metadata parsing module 452, segmentation module 454, and content analysis module 456. Alternatively, or in addition, referring to FIG. 2, in some implementations, detection of the attribute(s) of entertainment content 112/212/412 corresponding to the artistic intent of the producer of entertainment content 112/212/412 may be performed by software code 250/450, executed by hardware processor 244 of ambient lighting system 240, and using one or more of metadata parsing module 452, segmentation module 454, and content analysis module 456.

Flowchart 360 continues with interpreting the artistic intent of the producer of entertainment content 112/212/412 using the attribute(s) detected in action 362 (action 363). The artistic intent being interpreted in action 363 may include one or more of a color scheme, light intensity, emotional tone or mood, and tempo characteristic of segments of entertainment content 11/212/412. As discussed in detail above, content analysis module 456 may be used to detect attribute(s) in the form of features or properties of the content included in entertainment content 112/212/412. Those attribute(s) are identified in attribute data 476 output to artistic intent interpretation module 458 by content analysis module 456. In addition, in some implementations, artistic intent interpretation module 458 may receive metadata attribute(s) 472 of entertainment content 112/212/412 from metadata parsing module 452. Action 363 may then be performed based on attribute data 476 and/or metadata attribute(s) 472 by artistic intent interpretation module 458 of software code 150/450, executed by hardware processor 104 of system 100, or by artistic intent interpretation module 458 of software code 250/450, executed by hardware processor 244 of ambient lighting system 240.

In some implementations, artistic interpretation module 458 may include NN 478 in the form of a machine learning model trained to predict the artistic intent of the producer of entertainment content 112/212/412 using the attribute(s) detected in action 362. Thus, in some implementations, action 363 may be performed inferentially by NN 478. Moreover, as a trained, and re-trainable, machine learning model, NN 478 of artistic interpretation module 458 may improve its predictive performance over time as additional training data becomes available.

Flowchart 360 continues with composing ambient lighting routine 122/222/422 as a supplement to entertainment content 112/212/412 based on the artistic intent interpreted in action 363 (action 364). Ambient lighting routine 122/222/422 may include instructions for modulating the color and intensity, as well as the tempo of transitions between those colors and intensities, of ambient lighting within entertainment environment 134 so as to supplement and complement entertainment content 112/212/412 as entertainment content 112/212/412 is played by output device 120/220. Ambient lighting routine 122/222/422 is composed to modulate ambient lighting in a way that mirrors the artistic intent of the producer of entertainment content 122/222/422 as that artistic intent evolves across entertainment content 112/212/412. Action 364 may be performed by artistic intent interpretation module 458 of software code 150/450, executed by hardware processor 104 of system 100, or by artistic intent interpretation module 458 of software code 250/450, executed by hardware processor 244 of ambient lighting system 240.

In some implementations, flowchart 360 can conclude with action 364, described above. However, in other implementations, flowchart 360 continues with optionally controlling one or more lighting elements 148a/248a and/or 148b/248b to perform ambient lighting routine 122/222/422 while entertainment content 112/212/412 is played by output device 120/220 (action 365). As noted above, one or more lighting elements 148a/248a and/or 148b/248b are communicatively coupled to ambient lighting system 140/240. Thus controlling one or inure lighting elements 148a/248a and/or 148b/248b to perform ambient lighting routine 122/222/422 may be performed by software code 250/450, executed by hardware processor 244 of ambient lighting system 140/240. Moreover, in some implementations hardware processor 244 may be configured to control output device 120/220 to play entertainment content 112/212/412 while concurrently controlling one or more lighting elements 148a/248a and/or 148b/248b to perform ambient lighting routine 122/222/422.

As noted above, in some implementations, output device 120/220 includes display 124/224, and entertainment content 112/212/412 includes video. In addition, or alternatively, in some implementations, output device 120/220 includes speaker 226, and entertainment content 112/212/412 includes audio. Furthermore, it is noted that output device 120/220 may include display 124/224 and speaker 226 to enable play of entertainment content 112/212/412 in the form of AV content.

According to some implementations, hardware processor 104 of system 100 may execute software code 150/450 to perform actions 361, 362, 363, and 364 (hereinafter "actions 361-364") in an automated process from which human involvement is omitted. Furthermore, in some implementations hardware processor 244 of ambient lighting system 240 may execute software code 250/450 to perform actions 361-364, or actions 361-364 and 365, in an automated process.

In some implementations, entertainment content 112/212/412 may be scripted or "canned" content that is produced substantially in its entirety prior to being played by output device 120/220. In those implementations, ambient lighting routine 122/222/422 may be composed to supplement canned entertainment content 112/212/412 and may be stored in lighting effects database 116/216. Furthermore, in those implementations, ambient lighting routine 122/222/422 may be obtained from lighting effects database 116/216 prior to play of entertainment content 112/212/412 by output device 120/220, and may be performed by ambient lighting system 140/240 concurrently with play of entertainment content 112/212/412 by output device 120/220.

In some use cases, however, entertainment content 112/212/412 may be or include a live feed. For example, entertainment content 112/212/412 may be audio or AV content of a sports event or other competition that is aired by content source 110 as it occurs. In those implementations, hardware processor 104 of system 100 may be configured to execute software code 150/250, or hardware processor 244 of ambient lighting system 240 may be configured to execute software code 250/450, to compose ambient lighting routine 122/222/422 in real-time with respect to receiving live entertainment content 112/212/412 in action 361. For example, in some implementations, hardware processor 104 of system 100 may be configured to execute software code 150/250, or hardware processor 244 of ambient lighting system 240 may be configured to execute software code 250/450, to compose ambient lighting routine 122/222/422 having latency of less than approximately two seconds with respect to live entertainment content 112/212/412.

Thus, the present application discloses systems and methods for supplementing entertainment content with ambient lighting that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but rearrangements, modifications, and substitutions are possible without departing from the scope of the present disclosure.

What is claimed is:

1. A computing platform for use with a display and at least one lighting element separate from the display and communicatively coupled to the computing platform, the computing platform comprising:
   a hardware processor; and
   a memory storing a software code;
   the hardware processor configured to execute the software code to:
      receive an entertainment content to provide an entertainment in an environment by playing the entertainment content using the display, the entertainment content including a video content including a plurality of frames;
      divide each of the plurality of frames into one or more first regions and one or more second regions;
      detect at least one attribute of the entertainment content from the one or more first regions and not the one or more second regions;
      determine an artistic intent using the at least one attribute;
      compose an ambient lighting routine based on the artistic intent; and
      control the at least one lighting element to perform the ambient lighting routine and generate ambient lighting in the environment to supplement the entertainment provided by playing the entertainment content on the display.

2. The computing platform of claim 1, wherein the one or more first regions are located in a central region of each of the plurality of frames.

3. The computing platform of claim 1, wherein the at least one attribute of the entertainment content is further detected based on a camera focus in each of the plurality of frames.

4. The computing platform of claim 1, wherein the entertainment content comprises an audio content having a plurality audio segments, wherein the at least one attribute is further detected based on a type of an audio segment of the plurality audio segments.

5. The computing platform of claim 4, wherein the computing platform further comprises a speaker, and wherein the audio content is played, using the speaker, along with the video content.

6. A computing platform for use with a display and at least one lighting element separate from the display and communicatively coupled to the computing platform, the computing platform comprising:
   a hardware processor; and
   a memory storing a software code;
   the hardware processor configured to execute the software code to:
      receive an entertainment content to provide an entertainment in an environment by playing the entertainment content using the display, the entertainment content including a video content including a plurality of frames;
      determine a camera focus of each of the plurality of frames;
      detect at least one attribute of the entertainment content based on the camera focus of each of the plurality of frames;

determine an artistic intent using the at least one attribute;

compose an ambient lighting routine based on the artistic intent; and control the at least one lighting element to perform the ambient lighting routine and generate ambient lighting in the environment to supplement the entertainment provided by playing the entertainment content on the display.

7. The computing platform of claim 6, wherein the at least one attribute of the entertainment content further comprises one or more of a camera position used to capture the video content.

8. The computing platform of claim 6, wherein the hardware processor is further configured to apply a high-pass filtering or a low-pass filtering to the video content prior to detecting the at least one attribute, and wherein the at least one attribute is detected in the filtered video content of the entertainment content.

9. The computing platform of claim 6, wherein the entertainment content comprises an audio content having a plurality audio segments, wherein the at least one attribute is further detected based on a type of an audio segment of the plurality audio segments.

10. The computing platform of claim 9, wherein the computing platform further comprises a speaker, and wherein the audio content is played, using the speaker, along with the video content.

11. A method comprising:

receiving an entertainment content to provide an entertainment in an environment by playing the entertainment content using a display, the entertainment content including a video content including a plurality of frames;

dividing each of the plurality of frames into one or more first regions and one or more second regions;

detecting at least one attribute of the entertainment content from the one or more first regions and not the one or more second regions;

determining an artistic intent using the at least one attribute;

composing an ambient lighting routine based on the artistic intent; and controlling the at least one lighting element to perform the ambient lighting routine and generate ambient lighting in the environment to supplement the entertainment provided by playing the entertainment content on the display.

12. The method of claim 11, wherein the one or more first regions are located in a central region of each of the plurality of frames.

13. The method of claim 11, wherein the at least one attribute of the entertainment content is further detected based on a camera focus in each of the plurality of frames.

14. The method of claim 11, wherein the entertainment content comprises an audio content having a plurality audio segments, wherein the at least one attribute is further detected based on a type of an audio segment of the plurality audio segments.

15. The method of claim 14, further comprising:

playing the audio content, using a speaker, along with the video content.

16. A method comprising:

receiving an entertainment content to provide an entertainment in an environment by playing the entertainment content using the display, the entertainment content including a video content including a plurality of frames;

determining a camera focus of each of the plurality of frames;

detecting at least one attribute of the entertainment content based on the camera focus of each of the plurality of frames;

determining an artistic intent using the at least one attribute;

composing an ambient lighting routine based on the artistic intent; and controlling the at least one lighting element to perform the ambient lighting routine and generate ambient lighting in the environment to supplement the entertainment provided by playing the entertainment content on the display.

17. The method of claim 16, wherein the at least one attribute of the entertainment content further comprises one or more of a camera position used to capture the video content.

18. The method of claim 16, further comprising:

applying a high-pass filtering or a low-pass filtering to the video content prior to detecting the at least one attribute, wherein the at least one attribute is detected in the filtered video content of the entertainment content.

19. The method of claim 16, wherein the entertainment content comprises an audio content having a plurality audio segments, wherein the at least one attribute is further detected based on a type of an audio segment of the plurality audio segments.

20. The method of claim 19, further comprising:

playing the audio content, using a speaker, along with the video content.

* * * * *